United States Patent [19]
Nilsson

[11] 4,190,912
[45] Mar. 4, 1980

[54] LIFTING DEVICE

[76] Inventor: Lars A. H. Nilsson, Trollbergsvägen 3 S-572 00, Oskarshamn, Sweden

[21] Appl. No.: 914,455

[22] Filed: Jun. 12, 1978

[30] Foreign Application Priority Data

Jun. 17, 1977 [SE] Sweden ............................ 7707055

[51] Int. Cl.$^2$ ....................... A47B 83/04; B65G 67/12

[52] U.S. Cl. ........................................ 5/83; 5/81 R; 414/917

[58] Field of Search ............... 4/142; 212/18; 5/81 R, 5/83-89; 214/DIG. 10, 13, 151, 658

[56] References Cited

U.S. PATENT DOCUMENTS

| | | | |
|---|---|---|---|
| 1,385,424 | 7/1921 | Billings | 5/89 |
| 2,218,883 | 10/1940 | Jones | 5/89 |
| 2,494,591 | 1/1950 | Smith | 5/89 |
| 2,823,816 | 2/1958 | Eddison | 214/151 |
| 3,630,397 | 12/1971 | Batson | 214/DIG. 10 |
| 3,882,555 | 5/1975 | Edlund | 5/89 |

*Primary Examiner*—Casmir A. Nunberg
*Attorney, Agent, or Firm*—Ladas, Parry, Von Gehr, Goldsmith & Deschamps

[57] ABSTRACT

A lifting device for lifting and transferring a load, said device having a rigid carrier arm and transfer means for lateral movement of said carrier arm. Said transfer means includes two symmetrically disposed transfer assemblies each having a link member pivotably connected at a separate end of the carrier arm, a lever pivotably connected at one end to the associated link member, said lever being pivotably supported at its other end. Said transfer means also includes drive means and transmission means for simultaneous pivoting the levers in opposite directions thereby moving and transferring the carrier arm in its lateral direction.

17 Claims, 7 Drawing Figures

LIFTING DEVICE

BACKGROUND OF THE INVENTION

The present invention relates to a lifting device for lifting a load. Primarily, the lifting device is intended for lifting and/or moving a patient confined to bed between two places.

Such lifting devices, often referred to as patient lifters, are previously known for facilitating the work of the medical staff in hospitals and similar institutions for lifting and moving patients having reduced faculty of motion or being confined to their beds for other reasons. Prior art lifting devices are ofter bulky and difficult to handle and require for handling often more than one person. Moreover, prior art lifting devices generally are mounted on the floor or a wall and so valuable space is lost in the room where the lifting device is accomodated.

There are previously known patient lifters attached to the ceiling of a room, such lifters including a rigid carrier bar to be placed along and over a person to be lifted. The bar is supported at its both ends by two cables which over pulleys in the ceiling are connected to a telfer having two cable exits. A device for receiving and supporting a patient can be attached to the carrier bar. This type of lifting device only allows vertical movement. Therefore, when moving a patient from e.g. a stretcher to a bed, first the patient has to be lifted from the stretcher which then has to be removed whereupon the bed is brought in under the patient which is then lowered down onto the bed.

The Swedish laid-open specification 7508892-2 discloses a patient lifter including a carrier bar supported by a lever which is pivotably supported by a horizontal shaft. The carrier bar is movable in its lateral direction by rotation of said shaft. This patient lifter can be handled by one operator and allows movement of a patient between two support surfaces, e.g. a stretcher and a bed, without intermediate movement of said support surfaces. However, this patient lifter occupies a relatively large floor area.

SUMMARY OF THE INVENTION

The object of the present invention is to provide a new lifting device which obviates the above-mentioned drawbacks of prior art lifting devices and is particularly suited for operation in narrow spaces.

This object is achieved by means of a lifting device for lifting a load which device comprises a rigid carrier arm to be placed over said load, said carrier arm supporting means for receiving said load, a transfer means connected to said carrier arm for parallel movement of the carrier arm in its lateral direction. Said transfer means includes two similar transfer assemblies, each having a rigid link member pivotably connected at separate ends of the carrier arm, and a lever pivotably connected at one end to the associated link member and pivotably supported at its other end. Said transfer assemblies are symmetrically arranged for pivoting said levers in opposite directions, thereby allowing the ends of the link members connected to the carrier arm and so the carrier arm to be lifted and moved in lateral direction.

BRIEF DESCRIPTION OF THE DRAWINGS

For the purpose of elucidation the invention will be described in greater detail in the following with reference to the accompanying drawings, wherein.

DETAILED DESCRIPTION OF PREFERRED EMBODIMENTS OF THE INVENTION

The following description of the lifting device according to the invention is directed to an application as a patient lifter. However, as mentioned below the lifting device provided with a suitably structured load receiving means can be used for lifting any type of load.

Figure 1:
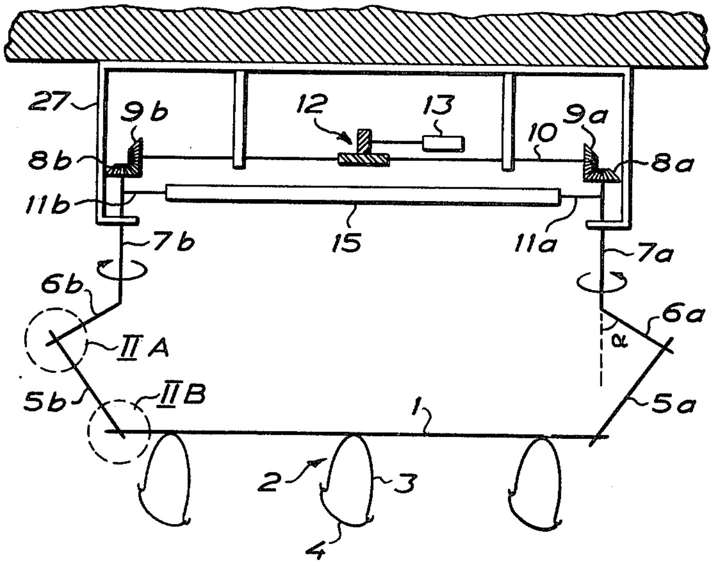
FIG. 1 is a simplified view showing the principle structure of a lifting device according to the invention.
Figure 3:
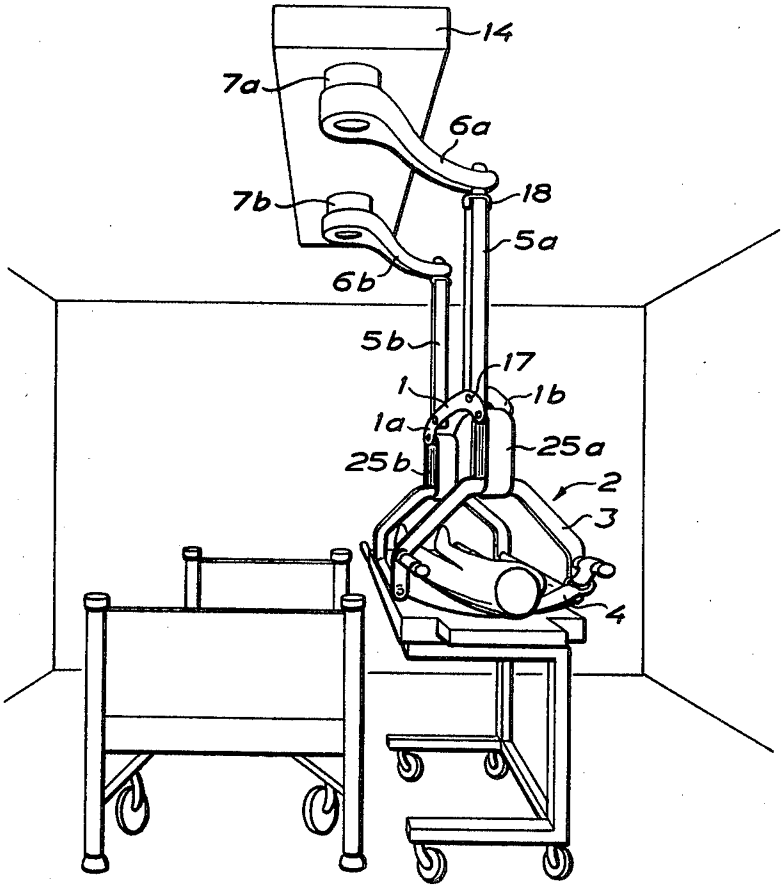
FIG. 3 illustrates a realization of the lifting device according to the invention.

Referring to FIG. 1 which schematically illustrates the principle structure of a lifting device according to the invention occupying its top position, the lifting device has a rigid carrier arm 1 with a longitudinal extension suitable for the particular application of the lifting device. Preferably, the carrier bar 1 includes a pipe or two parallel side members which are rigidly connected by means of cross members (FIG. 3).

Figure 4A:
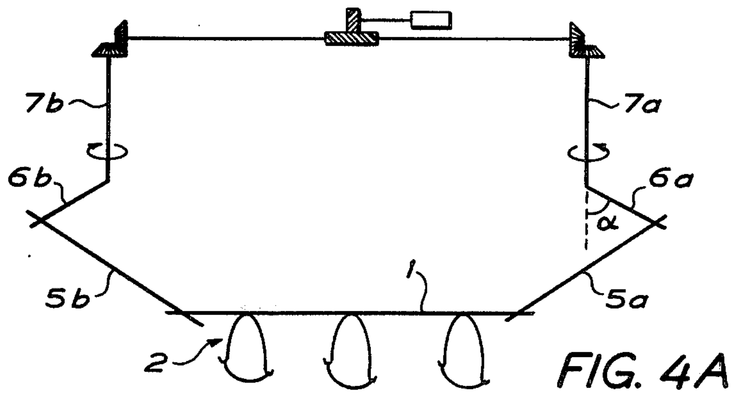
FIGS. 4A and 4B illustrate in two different positions in simplified manner a modified structure of the lifting device according to FIG. 1.
Figure 4B:
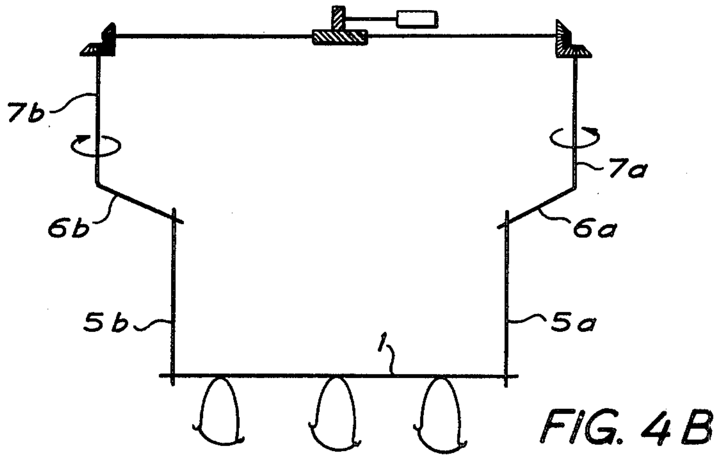

In FIGS. 1, 4A and 4B most of the components of the lifting device are illustrated in a simplified manner by means of straight lines, crossing lines showing the presence of articulations for allowing mutual movement. However, it is emphasized that the components illustrated as straight lines in practice also have a lateral extension.

A load receiving means 2 for receiving and supporting a patient is connected to the carrier arm 1 and supported thereby. Said receiving means can be made releasable from the lifting device and can also include the carrier arm. In FIG. 1 said load receiving means 2 is shown as consisting of several rigid yokes 3 connected to the carrier bar 1, lifting bands 4 being releasably attached to the legs of said yokes. However, said load receiving means 2 can be embodied in various other ways, another suitable embodiment for receiving patients being shown in FIG. 3.

Rigid, preferably straight link members 5*a* and 5*b* are pivotably connected to both the ends of the carrier arm 1 which link members at their other ends are pivotably connected to a respective lever 6*a* and 6*b*. These levers 6*a* and 6*b* are in turn pivotably supported and rigidly fixed to separate pivot shafts 7*a* and 7*b*, respectively. The pivot shafts 7*a*, 7*b* are supported in a frame 27 which is bolted to the ceiling of a room. In the embodiment of the lifting device which is described here the pivot shafts are vertical. However, as mentioned below, they can have other directions.

At their ends facing away from the levers 6*a* and 6*b* the vertical pivot shafts 7*a* and 7*b* have transmission members 8*a* and 8*b* which for transmitting a rotating movement to the pivot shafts engage corresponding transmission members 9*a*, 9*b* of a shaft 10. In the embodiment of the lifting device shown in FIG. 1, the shaft 10 is an elongated worm of a worm gear 12 the input shaft of which is coupled to a motor 13 which may be pneumatically or hydraulically driven but preferably is electrically driven.

The above mentioned components 13, 12, 10, 9*a*, 9*b*, 8*a*, 8*b*, 7*a*, 7*b*, 6*a*, 6*b* and 5*a*, 5*b* constitute transfer means for parallel movement of the carrier bar 1 in its lateral direction. Said transfer means including drive means transmission means is provided to drive said pivot shafts 7*a* and 7*b* in opposite rotational directions.

Apparently said transfer means includes two transfer assemblies interconnected by means of said drive means and transmission means. The two transfer assemblies are similar, the components thereof having identical lengths and structure. The length of the carrier arm 1 is equal to the distance between the pivot shafts 7*a* and 7*b*.

It is appreciated that the members having the same reference figures, e.g. levers 6*a* and 6*b*, have the same longitudinal extensions and so when rotating the pivot shafts 7*a* and 7*b* in opposite directions the carrier arm 1 will be transferred perpendicularly to its longitudinal extension. From an initial lifting position where the levers 6*a* and 6*b* are parallel and facing in the same direction the levers can be rotated either inwardly or outwardly thereby achieving the same lifting action on the carrier arm 1.

Figure 2A:
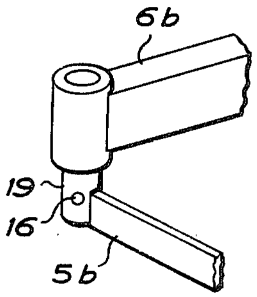
FIGS. 2A and 2B are partial detail views on a large scale showing essential portions of the lifting device in FIG. 1.
Figure 2B:
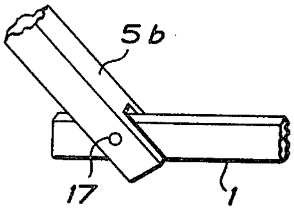

The connection of the link members 5*a* and 5*b* to the carrier arm 1 has such a structure that the link members can pivot around an axis essentially perpendicular to the longitudinal extension of the carrier arm which axis is horizontal when the lifting device is mounted on place. Preferably a shaft 17 (FIG. 2B) is used for this connection, thereby counter-acting the tendency of lateral swinging of the load receiving means. Another suitable articulation for this connection is a universal joint, such as a ball and socket. Such an articulation also allows movement between the link members 5*a* and 5*b* and the carrier arm around an axis parallel to the carrier arm and so lateral swinging motion of said load receiving means will not be counter-acted. The connection of the link members 5*a* and 5*b* to the respective levers 6*a* and 6*b* is made for allowing pivot around both a vertical and a horizontal axis perpendicular to the carrier arm. A suitable articulation in this case is a universal joint, such as a ball and socket (FIG. 3). However, as shown in FIG. 2A also a vertical pivot 19 can be pivotably mounted at the end of the respective lever 6*b* facing away from the associated pivot shaft which pivot at its lower end has a lateral through shaft 16 which is connected to the associated link member 5*b*. This latter articulation with rigid shafts counteract unfavourable swinging motions of said load receiving means.

Of course, the transmission between the output shaft 10 of the worm gear 12 and the two pivot shafts 7*a* and 7*b* can be constituted in many different ways. However, these transmissions are preferably embodied as bevel drives 8*a*, 9*a* and 8*b*, 9*b* respectively, the shafts 10, 7*a* and 7*b* being supported and carried in bearings in a suitable manner. The exchange gear reduction between the shaft 10 and the pivot shafts 7*a* and 7*b* preferably is 2:1 in order that the load on the levers 6*a* and 6*b* is kept at reasonable values when operating the lifting device. The drive means and transmission means described above sometimes may be too heavy to be fixed to the ceiling of rooms in older buildings. A considerably lighter drive means and transmission means (not shown) are based on a chain drive. In this case the transmission can include sprockets fixed at the ends of each pivot shafts 5*a*, 5*b* which sprockets are rotatable in different directions by means of an endless chrain having crossing parts. A central sprocket fixed on an additional shaft engages the chain and said shaft is driven over a gear connected by means of a motor.

The levers 6*a* and 6*b* are rigidly fixed to a respective pivot shaft 7*a* and 7*b* and extend downwardly therefrom under an angle of declination which is less than 90°. However, it is appreciated that in other embodiments of the lifting device the levers can form any angle to the pivot shafts and also extend upwardly therefrom.

In FIG. 1 the transfer means of the lifting device is shown entirely over the carrier arm and is mounted to the ceiling of a room by means of the frame 27 (see also FIG. 3). However, said transfer means and the associated frame can be mounted on the floor of a room, the pivot shafts 7*a* and 7*b* thereby extending upwardly from the floor. This latter alternative embodiment is of interest only in the case of ample space in the room where the lifting device is placed.

In said alternative embodiment of the lifting device the levers can however only be rotated inwardly in order that the carrier arm 1 shall be able to pass through its top position, in which the levers are directed towards each other and located in the same vertical plane.

In this alternative embodiment the carrier arm should be somewhat shorter than the distance between the pivot shafts 7*a*, 7*b* since otherwise the latter will obstruct the carrier arm when passing through its top position.

The operation of the lifting device is described below with reference to the embodiment of FIG. 1.

For lifting and transferring between two supporting surfaces a patient supported in said receiving means 2 the lifting device is put into a position where the levers 6*a* and 6*b* are parallel and the link members 5*a* and 5*b* are essentially vertical. The bed or similar resting place on which the patient to be lifted lies is inserted under the carrier arm 1 so that the latter takes a position along the person in question. Then the person is placed in said receiving means 2 and the lifting device can be activated. When starting the motor 13 the shafts 7*a* and 7*b* will rotate in opposite directions, e.g. so that the lever 6*a* and 6*b* are pivoted outwardly from the carrier arm as shown in FIG. 1. Since the ends of the levers 6*a* and 6*b* facing away from the pivot shafts 7*a* and 7*b* are turned outwardly the link members 5*a* and 5*b* will be brought along and so the ends of the link members connected to the carrier arm will be urged in a direction perpendicular to its longitudinal extension being both raised and displaced horizontally.

During the movement of the carrier arm from its bottom position to its top position (rotation of the pivot shafts over 90°) where the levers are located in the same vertical plane, the carrier arm describes a curve. When the rotation of the shafts are continued over another 90° the carrier arm performs a reverse movement, being lowered and displaced laterally to a second bottom position which is spaced from the starting position, the carrier arm thereby describing a curve which in relation to a vertical plane through the two pivot shafts 7*a* and 7*b* is symmetrical to said first mentioned curve.

By suitable selection of the lengths of the levers 6*a*, 6*b*, the link members 5*a*, 5*b* and the carrier arm as well as the angle $\alpha$ between the levers and the shafts 7*a*, 7*b* a desired shape of said curve is achieved. For a patient lifter said curve should have an initial steep slope upwardly which slope successively decreases. In this way a very appropriate movement is achieved for the lifting device in which movement the carrier arm in an initial stage principally is lifted whereupon the movement in horizontal direction gradually will increase until the top position of the carrier arm is reached. From this position the reverse movement takes place and the carrier arm is lowered on to the other side of the lifting device.

In accordance with a further feature of the invention a biasing device 15 is provided between two members 11*a*, 11*b* fixed to the pivot shafts 7*a* and 7*b*. The biasing device 15 may be shaped as a tension spring which has its most biased or extended state when the carrier arm takes any of its bottom positions. When the biasing device 15 is a tension spring said members 11*a*, 11*b* can be either rigid arms or cables the latter to be wound around the pivot shafts. The biasing device 15 is completely unloaded when the levers 6*a* and 6*b* are situated in the same vertical plane, i.e. when the carrier arm 1 takes its top position. When operating the lifting device the biasing device will contribute to the rotation of the pivot shafts during the lifting stage while during the lowering stage the biasing device will smooth the movement at the same time as a bias is built up in the biasing device.

It is appreciated that the biasing device 15 can be embodied in a variety of ways. Thus, it may also be hydraulic or pneumatic.

FIG. 3 illustrates a preferred embodiment of the lifting device. In this figure the same reference numerals are used as in FIGS. 1 and 2 for denoting the same components.

As shown in FIG. 3 the carrier arm 1 has two side members 1*a* and 1*b* which are rigidly connected by means of cross members. One cross member at each end of the carrier arm serves as a horizontal shaft 17 for the respective link member 5*a*, 5*b* for connecting the same to the carrier bar. The link members 5*a* and 5*b* are connected at their upper upper ends to a respective lever 6*a*, 6*b* by a ball and socket articulation 18.

The upper portions of the pivot shafts 7*a* and 7*b* are accommodated in a casing 14 togeter with the worm gear 12, the motor 13 and the biasing device 15.

In accordance with another embodiment of the lifting device shown in FIGS. 4A and 4B the carrier bar 1 is shorter than the distance between the two vertical pivot shafts 7*a* and 7*b*.

FIG. 4A illustrates the lifting device in a position where the levers 6*a* and 6*b* are rotated outwardly at a relative angle of 180° in which position the carrier arm 1 takes its top position. In FIG. 4B the lifting device is illustrated with the carrier arm 1 in its bottom position and the link members 5*a* and 5*b* are parallel and vertical. In this bottom position the two levers 6*a* and 6*b* are directed slightly towards each other from the respective pivot shafts.

In this embodiment of the lifting device the relative longitudinal extensions of the carrier arm 1 the link members 5*a* and 5*b* and the levers 6*a* and 6*b* are defined such that the link members take parallel position (bottom position of the carrier arm) when the two levers from parallel positions have been rotated inwardly towards each other a small angle, substantially 20°.

It is appreciated that in this embodiment the lifting height will be greater than for the embodiments shown in FIGS. 1 and 3. From the initial bottom position of the lifting device shown in FIG. 4B the two pivot shafts 7*a* and 7*b* are rotated counter-clockwise and clockwise, respectively (seen from above), the levers 6*a* and 6*b* thereby lifting the carrier arm 1 by intermediation of the link members 5*a* and 5*b*. In the movement of the levers from the position shown in FIG. 4B to the position where the levers are parallel, i.e. after a rotation of approximately 20° of the pivot shafts, the carrier arm 1 principally performs a movement upwardly while its movement in horizontal direction is small. Upon further rotation of the pivot shafts the movement in vertical direction will continue to dominate but gradually decreases in relation to the movement in horizontal direction until the carrier arm takes its top position where the levers are facing away from each other and located in the same vertical plane. When the rotation of the pivots shafts are continued the levers are brought out on the other side of the lifting device, the reverse movement taking place and the carrier arm being lowered to its bottom position. Similar to the embodiment shown in FIG. 1 the initial lifting and the final lowering of the carrier arm, when transferring the same, will be smooth and the speed of these stages is slower than the intermediate lateral movement of the carrier arm. Thus, it is appreciated that the embodiment of the lifting device shown in FIGS. 4A and 4B makes it possible to lift the carrier arm 1 higher than can be achieved by means of the embodiment shown in FIG. 1.

In a particularly preferred embodiment of the lifting device shown in FIGS. 4A and 4B the distance between the pivot shafts 7*a* and 7*b* is 80 cm, the length of the levers 6*a* and 6*b* is 65 cm, the length of the link members 5*a* and 5*b* is 80 cm, the length of the carrier arm 1 between its connecting points to the link members is 60 cm and the angle $\alpha$ between the levers and the pivot shafts is 80°. Thus, it is realized that the lifting device occupies a very small space.

The above described embodiments of the lifting device can be modified within the scope of the invention. Thus, the carrier arm 1 can be longer than the distance between the two vertical shafts. In such an embodiment the carrier arm takes its bottom position when the two levers are turned outwardly from each other. In order to achieve the greatest lifting height by means of this embodiment the pivot shafts are first pivoted in a direction towards each other until they are parallel and after continued movement they fall in the same vertical plane, in which position the carrier arm takes its top position. Then the levers are brought out on the other side of the lifting device and the reverse movement is obtained, i.e. the carrier arm is lowered.

As mentioned above the pivot shafts 7*a* and 7*b* need not be parallel to each other. Thus, the pivot shafts can be arranged in the same vertical plane with their bottom ends located at a greater distance from each other than their upper ends. This arrangemeng can be used when the carrier arm is shorter than the distance between the points on the pivot shafts from where the levers extend. On the other hand the pivot shafts can also be arranged in the same vertical plane with their bottom ends located at a smaller distance from each other than their upper ends. This arrangement can be used when the carrier arm is longer than the distance between the points on the pivot shafts from where the levers extend. When the two pivot shafts 7*a* and 7*b* are arranged at an angle a still greater lifting height can be obtained for the carrier arm. However, the bearings of the pivot shafts as well as their transmissions will be more complicated than in the embodiments of the lifting device shown in FIGS. 1 to 4B.

Figure 5:
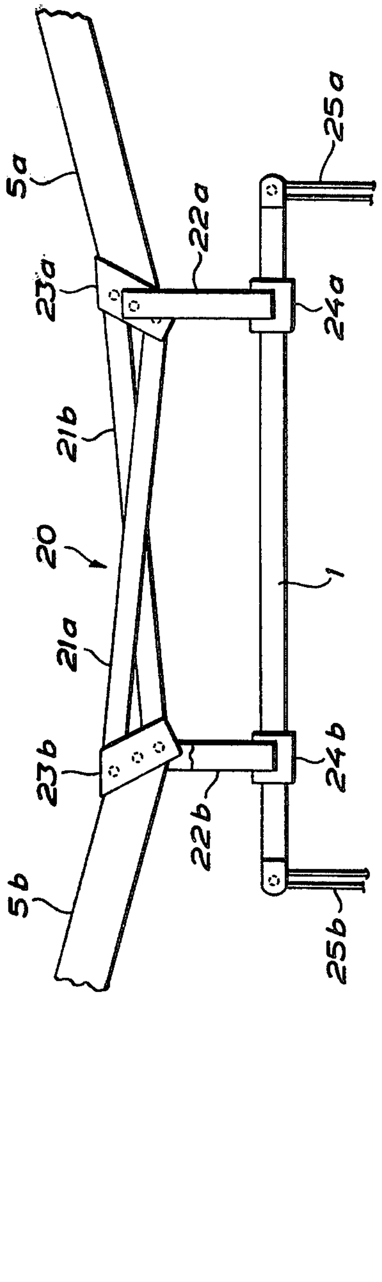
FIG. 5 illustrates a stabilizing means for the lifting device according to the invention, said stabilizing means being connected to the link members of the lifting device.

The above described embodiments of the lifting device are relatively sensible to unsymmetrical load, namely the condition where the centre of gravity of the load is displaced from a vertical plane of symmetry across the carrier arm. Thus, if the patient is placed in said load receiving means such that the centre of gravity of the patient is displaced a considerable distance from said plane of symmetry the carrier arm will tend to incline relative the horizontal plane and the lifting device will not operate satisfactorily. In order to counteract said inclining tendency of the carrier arm a stabilizing means 20 shown in FIG. 5 is provided.

Said stabilizing means 20 includes two rigid bars 21*a* and 21*b* which at their ends are pivotably connected between the link members 5*a* and 5*b* in a crossing relation. Stabilizing means 20 shown in FIG. 5 is arranged between the bottom ends of the link members, and the carrier arm 1 is suspended between spacers 22*a* and 22*b* under said stabilizing means. However, it is appreciated that the stabilizing means 20 also can be connected to the link members at a distance from their bottom ends and so it may simply be mounted on the above described embodiments of the lifting device.

Said stabilizing means 20 comprises U-shaped clevises 23*a*, 23*b* having opposite lugs and a connecting web the latter being rigidly fixed to the respective link members at the lower ends thereof such that the clevises open up towards each other. The bars 21*a* and 21*b* are disposed in parallel vertical planes and have their ends inserted between the lugs of a respective clevis 23*a*, 23*b* where they are pivotably supported by means of horizontal shafts. From FIG. 5 it is seen that the bars 21*a* and 21*b* are symmetrically arranged such that the bar 21*a* at one end is mounted below the bar 21*b* but at its other end is mounted over the bar 21*b*, the corresponding relation applying to the bar 21*b*. The upper ends of the spacers 22*a* and 22*b* which are connected to the clevises have two legs which reach around the associated clevis 23*a* and 23*b*, respectively. A horizontal shaft through the legs and the clevis allows the necessary rotation between the link members and the carrier bar 1, in this case the spacers.

If e.g. the spacer 22*a* is subjected to a greater load than the spacer 22*b* the lower end of the link member 5*a* will tend to sink in relation to the lower end of the link member 5*b*. However, this sinking of the link member 5*a* is counter-acted by the stabilizing means 20 in that a couple of forces is transmitted over the clevises and the bars 21*a* and 21*b* for urging the lower end of the link member 5*b* down to the same lever as the lower end of the link member 5*a*. In this way the link members 5*a* and 5*b* will be maintained at the same level of height and the carrier arm will be horizontal. Of course the corresponding conditions hold if instead the lower end of the link member 5*b* is subjected to a greater load than the lower end of the link member 5*a*.

It is realized that said stabilizing means 20 can be constructed in several other ways as long as it includes elements coupled to the link members which elements in response to loads on the link members transfer from each link member to the other link member a force corresponding to the difference in the load.

In the embodiment of the lifting device provided with said stabilizing means shown in FIG. 5 the distance between the link members is kept more or less constant by means of the bars 21*a* and 21*b* and so the carrier arm 1 can be rotatably supported by the spacers 22*a*, 22*b* and displaceable through the spacers. In this case the carrier arm is cylindrical and each connecting member 24*a* and 24*b* of the spacers for connecting the respective spacer to the carrier arm consists of a cylindrical sleeve having a bearing, preferably made of Teflon ®, which allows the carrier arm to be rotated around its own axis.

From the two ends of the carrier arm wide bands or belts 25*a* and 25*b*, e.g. of plastic material, extend downwards for supporting said load receiving means (not shown) having a suitable structure, e.g. of that kind shown in FIG. 3 where the belts 25*a* and 25*b* also is shown. The belts 25*a*, 25*b* have a suitable length such that the individual lifting bands 4 of said load receiving means reach desired height level when the carrier arm takes its bottom position.

The lifting device has been described above in connection with a load receiving means 2 suited for lifting a person confined to bed or having reduced faculty of motion. However, any type of load receiving means can be connected to the carrier arm in order to lift and/or transfer other types of loads.

What is claimed is:

1. A lifting device for lifting a load; comprising means for receiving the load, a rigid carrier arm to be placed over the load and supporting said means for receiving the load, and transfer means connected to said carrier arm for parallel movement thereof in its lateral direction, said carrier arm having two opposite ends and said transfer means including two separate but similar transfer assemblies associated with the two opposite ends respectively of the carrier arm and each including a link member having first and second opposite ends and a lever also having first and second opposite ends, said lever being pivotably supported at said first end thereof to be rotated and being pivotably connected at said second end to said first end of said link member, and said link member being pivotably connected at said second end thereof to the associated end of said carrier arm, and said transfer assemblies being symmetrically arranged for pivoting said levers in opposite directions, thereby causing said second ends of the link members to be lifted and moved in lateral direction.

2. A lifting device as claimed in claim 1, wherein each transfer assembly the pivotable connection between the link member and the carrier arm is an articulation permitting movement around a horizontal axis.

3. A lifting device as claimed in claim 2, wherein each transfer assembly the articulation between the link member and the carrier arm also permits movement around a vertical axis.

4. A lifting device as claimed in claim 1, wherein in each transfer assembly the lever is mounted on a separate pivot shaft for allowing the lever to pivot in rotating the pivot shaft.

5. A lifting device as claimed in claim 4, said device being placed in a room, and wherein the pivot shafts are supported in an overhead frame, e.g. fixed to the ceiling of the room.

6. A lifting device as claimed in claim 1, wherein in each transfer assembly the pivotable connection between the link member and the lever is an articulation permitting movement around a horizontal and a vertical axis.

7. A lifting device as claimed in claim 4, wherein the distance between the connections of the link members to the carrier arm is equal to the distance between the mounting places of said levers on the pivot shafts.

8. A lifting device as claimed in claim 4, wherein the distance between the connections of the link members to the carrier arm is less than the distance between the mounting places of said levers on the pivot shafts.

9. A lifting device as claimed in claim 4, 7 or 8, wherein the pivot shafts are vertical.

10. A lifting device as claimed in claim 1, wherein said transfer means comprises drive means and transmission means for pivoting said levers in opposite directions.

11. A lifting device as claimed in claim 10, wherein the lever of each transfer assembly is mounted on a separate vertical pivot shaft, and wherein said transmission means comprises a worm gear mounted between said pivot shafts, the worm of said worm gear at its ends being rotatably engaged to said pivot shafts.

12. A lifting device as claimed in claim 11, wherein first bevel gear wheels are fixed at the ends of said worm and second bevel gear wheels are fixed to the pivot shafts, one first and one second bevel gear wheel being rotatably engaged.

13. A lifting device as claimed in claim 2, 3 or 6, wherein in each transfer assembly the articulations between the link member and the carrier arm, on one hand and the lever on the other hand are universal joints.

14. A lifting device as claimed in claim 4, wherein in each transfer assembly the lever extends downwards from the associated pivot shaft and declines therefrom an angle less than 90°.

15. A lifting device as claimed in claim 1, further comprising stabilizing means mounted between the link members for transferring forces therebetween when the centre of gravity of the load in said receiving means is displaced from a vertical plane of symmetry across the carrier arm, thereby compensating for uneven load and maintaining the carrier arm horizontally.

16. A lifting device as claimed in claim 15, wherein said stabilizing means comprises two rigid bars each of which connects the two link members, the ends of said bars being pivotably connected to the link members for movement around horizontal shafts, each bar at one end being connected to one of said link members at a level below the connection of the other bar, while the other end of each bar being connected to the other link member at a level over the connection of the other bar.

17. A lifting device as claimed in claim 1 or 15, wherein the lever of each transfer assembly is mounted on a separate pivot shaft, said lifting device further comprising biasing means provided to cooperate with said pivot shafts over members fixed to each pivot shaft, said biasing means being non-actuated when the carrier arm takes its top position, rotation of said pivot shafts for lowering the carrier arm resulting in charging of said biasing means.

* * * * *